Figure 1:
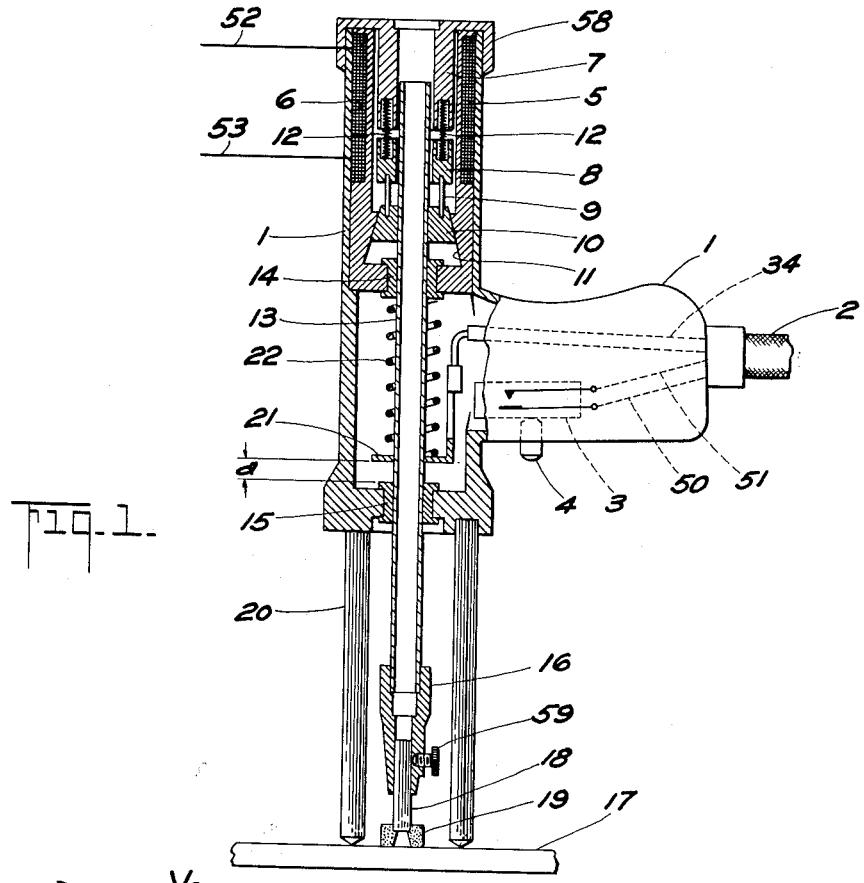

Sept. 25, 1962   W. P. VAN DEN BLINK ETAL   3,056,016
METHOD OF STUD WELDING AND APPARATUS THEREFOR
Filed Nov. 2, 1959                        2 Sheets-Sheet 1

Sept. 25, 1962   W. P. VAN DEN BLINK ETAL   3,056,016
METHOD OF STUD WELDING AND APPARATUS THEREFOR
Filed Nov. 2, 1959   2 Sheets-Sheet 2

INVENTOR
W. P. VAN DEN BLINK
E. H. ETTEMA
BY
AGENT 3,056,016
METHOD OF STUD WELDING AND APPARATUS THEREFOR

Willem Pieter van den Blink and Eelke Herman Ettema, Utrecht, Netherlands, assignors to North American Philips Company, Inc., New York, N.Y., a corporation of Delaware
Filed Nov. 2, 1959, Ser. No. 850,126
Claims priority, application Netherlands Nov. 14, 1958
7 Claims. (Cl. 219—98)

Our invention relates to a method of stud welding and to stud-welding apparatus.

The term "stud-welding" as used herein is to be understood to mean an electric-arc welding process in which a metal member, such as a stud, bolt, or the like, is welded to a workpiece. The invention is particularly concerned with stud welding of the type described for instance in U.S. Patent 2,509,999, in which the welding is initiated through an annular body of conductive slag-forming material, hereinafter referred to as a cartridge, which supports the stud or bolt from the workpiece until after the arc has been struck.

In this known process the arc length is determined by the dimensions of the cartridge which also initiates the arc and controls the arcing time, i.e. the interval between striking of the arc and bringing the stud into contact with molten pool formed on the workpiece. The arcing time, and thus the results of the welding, are highly dependent upon the softening of the cartridge which in turn depends upon its shape, composition, and electrical conductivity. As these properties are difficult to control in practice, it frequently happens that consistently good results are not always obtained because of varying contact times.

The main object of our invention is to overcome the above difficulty and to provide a method and apparatus by which the arcing time may be set to any desired predetermined value and will be independent of the properties of the cartridges used.

In accordance with the method of the invention we hold the stud at a certain distance from the workpiece during a holding period beginning at the time the welding process is initiated, or shortly thereafter but while the cartridge is still capable of supporting the stud. This holding period is continued during the softening of the slag-forming cartridge and for a certain time during which the current passes through the cartridge but the arc is not yet struck, and is terminated a predetermined time after the arc has been struck to thereby permit the stud to engage the molten pool which has been formed on the workpiece.

The apparatus according to the invention comprises a stud-welding gun which basically may be similar in construction to any of the numerous well-known types having a movable holder for a stud, bolt, or the like, which is urged toward the workpiece by suitable resilient means, such as a spring. In accordance with the invention the gun is provided with holding means to temporarily hold the stud in a position in which it is spaced from the workpiece, and timing means which control the releasing of the holding means and which are controlled or initiated by conditions occurring when the arc is struck, for instance a variation in the welding current or voltage.

We are aware of the fact that it has been proposed to use stud-welding guns which hold the stud from the workpiece by means of a holding device for a certain period of time during the welding. However, in welding with such guns a cartridge is not used as the stud is provided on its tip with material which melts and influences the arc length. Furthermore, in such guns the holding device is controlled by a timing device which is set for a predetermined time and which is actuated simultaneously with the switching on of the current. In such cases the actuation of the timing device is not necessarily dependent upon the striking of the arc, and thus has the disadvantage that the time during which the holding device is operative is not necessarily the same as the arcing time. The method and apparatus of the present invention does not have this disadvantage, and furthermore has the advantage that studs having special starting tips are not required. In addition, the invention makes it unnecessary to use special precautions to prevent premature failure of the cartridge due to the pressure of the stud, such as the use of cardboard reinforcing rings, or a special composition of the cartridge.

Figure 2:
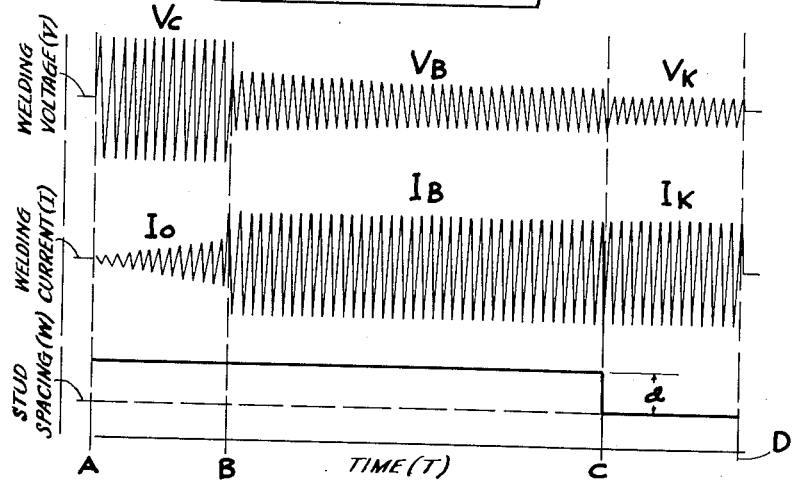
Figures 3, 4:
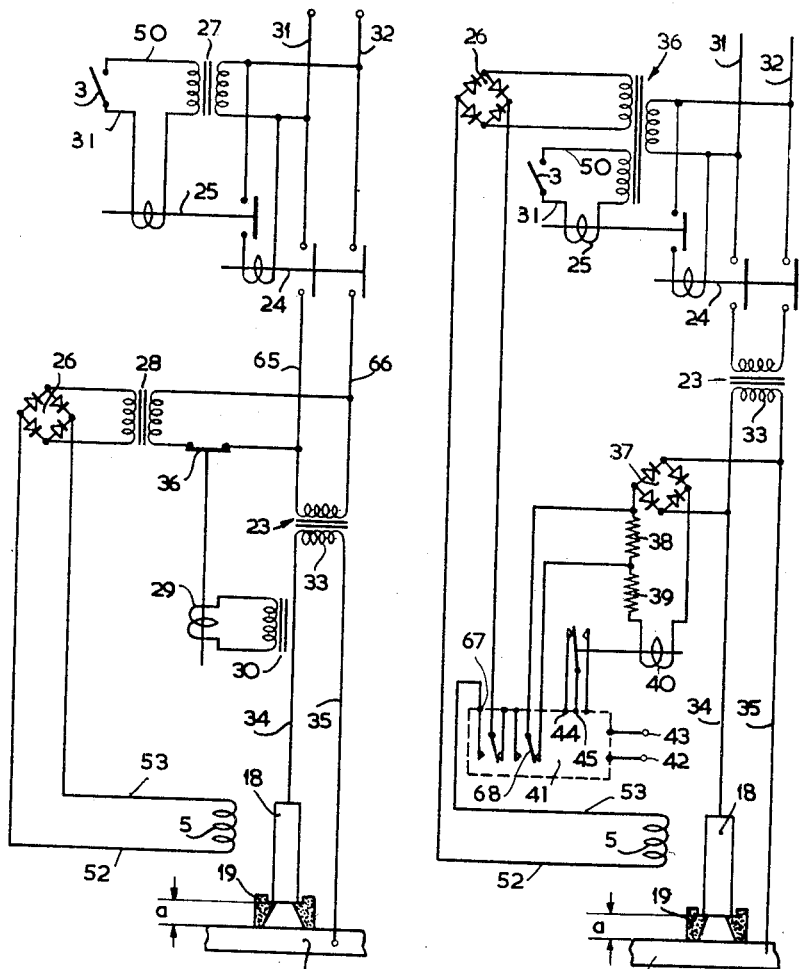

In order that our invention may be clearly understood and readily carried into effect, we shall describe the same in more detail with reference to the accompanying drawing in which:

FIGURE 1 is a partly-sectionized elevation of a stud-welding gun suitable for carrying out our method, FIG. 2 is a graph showing the spacing of the stud from the workpiece with respect to the welding current and welding voltage, FIG. 3 is a schematic wiring diagram of an apparatus for controlling the gun of FIGURE 1, and FIG. 4 is a schematic wiring diagram of a control apparatus according to another embodiment of the invention.

The stud-welding gun shown in FIGURE 1 comprises a housing 1 of non-magnetic material having a projecting handle portion and having secured to its lower end three supports 20 (only two being shown), which bear upon a workpiece 17 to which a stud 18 is to be welded. Secured to the upper portion of frame 1 is a cup-shaped metal member 11 having a conically-shaped cavity. Slideably supported on two bushings 14 and 15 fixedly secured to member 11 and housing 1 respectively, is a metal tube 13 to the lower end of which is fixedly secured a bushing 16. Stud 18 is adjustably secured to bushing 16, for instance by means of a set screw 59, and is supported by a cartridge 19 resting upon workpiece 17. Cartridge 19 may be of various shapes and compositions, for instance such as described in U.S. Patents 2,829,234 and 2,833,914. Fixedly secured to tube 13 is a metal support 21 which also serves to supply welding current to stud 18, and for this purpose is connected to one end of a supply conductor 34. A compression spring 22 having one end engaging member 21 and the other end engaging bushing 14 serves to urge electrode 18 toward workpiece 17, whereas support 21 also acts as a stop when it engages the upper surface of bushing 15. Supported within the handle portion of housing 1 is a normally-open switch 3 adapted to be closed by pressing a push button 4 and provided with two leads 50 and 51 which, together with conductor 34, pass through a cable 12 to the control apparatus, later to be described.

In accordance with the invention, the gun is provided with holding means which retains tube 13 and stud 18 in the position shown until a predetermined time after the arc is struck and which comprise two semi-circular clamping members 10 located in the conical-shaped chamber of member 11. Clamping members 10 are connected by flexible members 9, for instance of flexible wire, to a movable annular armature 8 of soft iron. Members 10 are provided in their upper portions with cavities in which are fixedly secured the lower ends of compression springs 12 whose upper ends are fixedly secured in corresponding cavities provided in the lower portion of a stationary annular core 7 of soft magnetic material. Core 7 has an internally-threaded annular flange portion 58 by which it is secured to housing 1. Located in an annular space 6 between the upper ends of housing 1 and member 11 is a solenoid coil 5 having leads 52 and 53 adapted to be connected to the control apparatus, later to be described.

When coil 5 is energized clamping members 10 are raised and urged toward each other to thereby clamp rod 13 and retain electrode 18 in the position shown in FIG. 1. When coil 5 is de-energized springs 12 force armature 8 downwardly to thereby release clamping members 10 and permit electrode 18 to be pressed toward workpiece 17 by the action of spring 22. At the time the coil 5 is de-energized the cartridge 19 has melted or disintegrated sufficiently to permit stud 18 to move downwardly only a distance $a$ by stop 21 which engages the upper surface of bushing 15. Distance $a$ is generally equal to the distance between the end of stud 18 and workpiece 17 (in the position shown in FIG. 1) but may be increased by an amount, known as "protrusion," equal to the distance stud 18 is to penetrate workpiece 17.

The method of the invention will be described in connection with FIG. 1 and the graph of FIG. 2 which has an abscissa axis indicating time, an upper portion indicating welding voltage, a middle portion indicating welding current, and a lower portion indicating the distance $a$. At point A the welding voltage V is applied between electrode 18 and workpiece 17. As a rule we prefer to actuate the holding device at this time, i.e. start the holding period, although this may be effected shortly afterwards provided it is done before cartridge 19 begins to disintegrate. During the time between points A and B, which is called the starting period, the welding voltage is an open circuit voltage $V_C$ and remains substantially constant, whereas the welding current $I_O$ slowly increases during this period. At the termination of the starting period A—B, all or part of which may be included in the holding period, the arc is struck and the welding current increases to a value $I_B$ while the welding voltage decreases to a value $V_B$. At point C the arcing time, as well as the B—C holding period, terminates, whereupon stud 18 moves through the distance $a$ into a molten pool formed on workpiece 17, and the welding circuit is short circuited to reduce the welding voltage to a value $V_K$. At point D the welding cycle is completed. According to the method of the invention the holding period, i.e. the arcing time B—C, and any additional time stud 18 is held during the starting period A—B, is accurately controlled by suitable timing means actuated directly or indirectly by the current variations or the voltage drop occurring at point B. While good results are obtained when the timing means are controlled by the current variations, we prefer to utilize the voltage drop because the apparatus is more versatile in that the value $V_B$ remains substantially the same for cartridges of various sizes, whereas the value $I_B$ depends upon current adjustments and thus varies for various sizes of cartridges.

FIGURES 3 and 4 illustrate schematically two types of apparatus embodying the invention and in these figures certain parts shown in FIGURE 1 are indicated by the same reference numerals. In the apparatus shown in FIGURE 3 the actuation of the timing means depends upon the welding current variations, whereas the apparatus of FIGURE 4 utilizes the voltage drop.

The apparatus shown in FIGURE 3 comprises two supply leads 31 and 32 adapted to be connected to a suitable A.C. power supply and connected through the contacts of normally-open magnetic contactor 24 and leads 65 and 66 to the primary winding of a welding transformer 23 having a secondary winding 33. The coil of contactor 24 is connected to leads 31 and 32 through the normally-open contact of a control relay 25 which is controlled by push button 3 connected in series by conductors 50 and 51 with the coil and the secondary winding of step-down transformer 27 whose primary winding is connected to leads 31 and 32. Secondary winding 33 has one terminal connected through a conductor 34 to stud 18, and its other terminal connected through conductor 35 to the workpiece 17 to thereby form the welding circuit. The coil 5, which as explained above, serve to temporarily hold stud 18 in a position spaced from the workpiece, is connected through conductors 52 and 53 and a two-phase rectifier 26 to the secondary winding of step-down transformer 28 whose primary winding is connected to leads 65 and 66 through the normally-closed contact 36 of a time delay relay 29 whose coil is energized by a current transformer 30 connected to conductor 34.

With the apparatus in the position shown in FIGURE 3 the stud 18 is maintained at a distance $a$ from the upper surface of workpiece 17 by cartridge 19 and is urged toward the workpiece by spring 12 (See FIGURE 1). When push button 3 is closed relay 25 closes thereby energizing contactor 24 and connecting welding transformer 23 to supply leads 31 and 32 which energizes the welding circuit comprising secondary winding 33, conductor 34, stud 18, cartridge 19, workpiece 17, and conductor 35. At this time the primary winding of transformer 28 is connected to leads 65 and 66 by means of normally-closed contact 36 of the time delay relay 29 to thereby energize coil 5 through rectifier 26 and leads 52 and 53, and start the holding period during which stud 18 is held spaced from workpiece 17 by the holding means of FIG. 1. When an arc is struck between stud 18 and workpiece 17 a current variation is produced in the welding circuit i.e. lead 34, to thereby energize the timing relay 29. Relay 29 is set for a predetermined time, for example the time B—C shown in FIGURE 2, and at the end of this time contact 36 opens to thereby de-energize transformer 28 and coil 5 so that stud 18 will be moved by spring 12 into a molten pool produced on workpiece 17. Push button 3 is then released thereby de-energizing the apparatus, whereupon the gun is removed from stud 18 which has been welded to the workpiece.

The apparatus shown in FIGURE 4 is in many respects similar to that shown in FIGURE 3, and the same reference numerals are used to denote the same parts. However, in FIGURE 4 the transformer 27 of FIGURE 3 is replaced by a step-down transformer 36 having a secondary winding which serves to energize coil 25 and a second secondary winding which serves to energize coil 5 through a rectifier 26 and contact 67 of an electronic timing relay 41.

As electronic timing relays of various types are well-known in the art, it is believed that a detailed description of the same is unnecessary. Relay 41 is connected to a suitable supply voltage through terminals 42 and 43 and has control contacts 44 and 45, which in the position shown are connected together so that the relay is energized. Contacts 44 and 45 are actuated by a voltage-responsive relay 40 connected through resistors 38 and 39 and a two-phase rectifier 37 to conductors 34 and 35. Relay 41 has contact 68 connected to shunt resistor 38.

In operation of the apparatus closure of push button 3 energizes the welding circuit 33, 34, 18, 19, 17, and 35 similarly to the arrangement shown in FIGURE 3. The open-circuit voltage of secondary winding 33 energizes voltage relay 40 through rectifier 37 and resistors 38 and 39, resistor 38 being short-circuited by contact 66, with the result that contacts 44 and 45 are opened and the timing relay 41 is set to its zero condition. At the same time contacts 67 of relay 41 are closed to thereby energize coil 5 through rectifiers 26 and transformer 36, whereupon the holding period is initiated.

When the arc is struck between stud 18 and workpiece 17 the open-circuit voltage across winding 33 drops materially for example to approximately 30 volts (see FIGURE 2). Resistors 38 and 39 are so proportioned that relay 40 will release when the open-circuit voltage drops to about 45 volts at which time contacts 44 and 45 are connected and relay 41 starts the timing cycle. After the predetermined time for which relay 41 has been set has expired contacts 67 open to thereby deenergize coil 5, and at the same time resistor 38 is short circuited by contact 66. Push button 3 is then released whereupon the apparatus assumes the position shown in FIGURE 4.

While we have described our invention in connection with specific examples and certain embodiments, we do not desire to be limited thereto as obvious modifications thereof will readily present themselves to one skilled in this art.

What is claimed is:

1. A method of electric-arc welding a metal stud-like member to a metal workpiece using a cartridge of conductive slag-forming material adapted to be melted or disintegrated by the heat of the welding arc, comprising the steps of positioning the cartridge upon a workpiece, supporting the member by the cartridge while urging the same toward the workpiece, applying a voltage between the member and the workpiece to thereby pass current through the cartridge and initiate the welding cycle, supporting the member independently of the cartridge during a holding period beginning while the cartridge is still capable of supporting the member, and terminating the holding period at a predetermined time after the occurrence of an electrical condition caused by striking the arc to thereby permit the member to engage the workpiece.

2. A method of electric-arc welding a metal stud-like member to a metal workpiece using a cartridge of conductive slag-forming material adapted to be melted or disintegrated by the heat of the welding arc, comprising the steps of positioning the cartridge upon a workpiece, supporting the member by the cartridge while urging the same toward the workpiece, applying a voltage between the member and the workpiece to thereby pass current through the cartridge and initiate the welding cycle, supporting the member independently of the cartridge during a holding period beginning while the cartridge is still capable of supporting the member, and terminating the holding period at a predetermined time after the occurrence of an increase in the welding current caused by striking the arc to thereby permit the member to engage the workpiece.

3. A method of electric-arc welding a metal stud-like member to a metal workpiece using a cartridge of conductive slag-forming material adapted to be melted or disintegrated by the heat of the welding arc, comprising the steps of positioning the cartridge upon a workpiece, supporting the member by the cartridge while urging the same toward the workpiece, applying a voltage between the member and the workpiece to thereby pass welding current through the cartridge and initiate the welding cycle, supporting the member independently of the cartridge during a holding period beginning while the cartridge is still capable of supporting the member, and terminating the holding period at a predetermined time after the occurrence of a decrease in the welding voltage caused by striking the arc to thereby permit the member to engage the workpiece.

4. An apparatus for electric-arc welding a metal stud-like member to a workpiece using a cartridge of conductive slag-forming material adapted to melt or disintegrate under the influence of the arc, comprising a support adapted to be arranged with one end adjacent the workpiece, a stud-carrying member mounted on said support so as to be movable in the direction of said end, means urging said stud-carrying member toward said end, means for holding said movable member against the action of said urging means, means to initiate the operation of said holding means, a welding circuit, means including a timing device to continue the operation of said holding means for a predetermined time period, and means associated with said circuit to initiate the operating of said timing means upon the occurrence of an electrical condition resulting from striking of the welding arc.

5. An apparatus for electric-arc welding a metal stud-like member to a workpiece using a cartridge of conductive slag-forming material adapted to melt or disintegrate under the influence of the arc, comprising a support adapted to be arranged with one end adjacent the workpiece, a stud-carrying member mounted on said support so as to be movable in the direction of said end, means urging said stud-carrying member against the action of said urging means, means to actuate said holding means, a welding circuit, means including a timing device to continue the operation of said holding means for a predetermined time period, and means associated with said circuit to initiate the operating of said timing means upon the decrease in welding voltage resulting from striking of the welding arc.

6. An apparatus for electric-arc welding a metal stud-like member to a workpiece using a cartridge of conductive slag-forming material adapted to melt or disintegrate under the influence of the arc, comprising a support adapted to be arranged with one end adjacent the workpiece, a stud-carrying member mounted on said support so as to be movable in the direction of said end, means urging said stud-carrying member toward said end, means for holding said movable member against the action of said urging means, means to initiate the operation of said holding means, a welding circuit, means including a timing device to continue the operation of said holding means for a predetermined time period, and means associated with said circuit to initiate the operating of said timing means upon the increase in welding current resulting from striking of the welding arc.

7. An apparatus for electric-arc welding a metal stud-like member to a workpiece using a cartridge of conductive slag-forming material adapted to melt or disintegrate under the influence of the arc, comprising a support adapted to be arranged with one end adjacent the workpiece, a stud-carrying member mounted on said support so as to be movable in the direction of said end, means urging said stud-carrying member toward said end, an electromagnet for holding said movable member against the action of said urging means, means to energize said magnet, a welding circuit, means including a timing device to continue the energization of said magnet for a predetermined time period, and means associated with said circuit to initiate the operating of said timing means upon the occurrence of an electrical variation in the welding circuit resulting from striking of the welding arc.

References Cited in the file of this patent

UNITED STATES PATENTS

| | | |
|---|---|---|
| 2,057,670 | Grecca | Oct. 20, 1936 |
| 2,459,957 | Palmer | Jan. 25, 1949 |
| 2,509,999 | Van der Willigen | May 30, 1950 |
| 2,648,748 | Sayer | Aug. 11, 1953 |
| 2,776,361 | Essig | Jan. 1, 1957 |
| 2,932,725 | Ainsworth | Apr. 12, 1960 |